United States Patent [19]

Francisco

[11] Patent Number: 4,991,865
[45] Date of Patent: Feb. 12, 1991

[54] AUTOMATIC SELF-ALIGNING TRAILER HITCH

[76] Inventor: Thomas E. Francisco, 27 Sherry Dr., Cheektowaga, N.Y. 14303

[21] Appl. No.: 396,981

[22] Filed: Aug. 21, 1989

[51] Int. Cl.$^5$ .............................................. B60D 1/14
[52] U.S. Cl. ................................ 280/477; 280/479.2; 280/479.3
[58] Field of Search ................... 280/477, 479.2, 479.3, 280/491.2, 438.1, 474, 480.1, 482, 486, 509, 508, 510

[56] References Cited

U.S. PATENT DOCUMENTS

| | | | |
|---|---|---|---|
| 776,292 | 11/1904 | Buller | 280/508 |
| 2,447,737 | 8/1948 | Christensen | 280/482 |
| 2,676,034 | 4/1954 | Tracey | 280/508 |
| 2,693,368 | 11/1954 | Petron | 280/482 |
| 2,878,035 | 3/1959 | Downey | 280/482 |
| 3,169,028 | 2/1965 | Scrivner | 280/479.2 |
| 3,169,782 | 2/1965 | Columbus | 280/479.2 |
| 3,860,267 | 1/1975 | Lyons | 280/479.3 |
| 4,264,429 | 5/1981 | Eichstadt | 280/482 |

FOREIGN PATENT DOCUMENTS 2059896 4/1981 United Kingdom ................ 280/482

*Primary Examiner*—Mitchell J. Hill
*Attorney, Agent, or Firm*—Howard J. Greenwald

[57] ABSTRACT

An automatic trailer hitch for use with a draft vehicle is disclosed. This hitch contains devices for attaching its two ends to a trailer and to a vehicle for towing the trailer. When the hitch is being connected to the vehicles, it may be extended in length; the presence of at least two telescoping members in the hitch allows such extension. Once the hitch has been connected to the vehicles, the towing vehicle may be backed towards the draft vehicle, thereby contracting the length of the hitch. A locking mechanism, comprised of a spring-loaded pawl, locks the hitch into its contracted position once it has reached a certain specified minimum length.

11 Claims, 6 Drawing Sheets

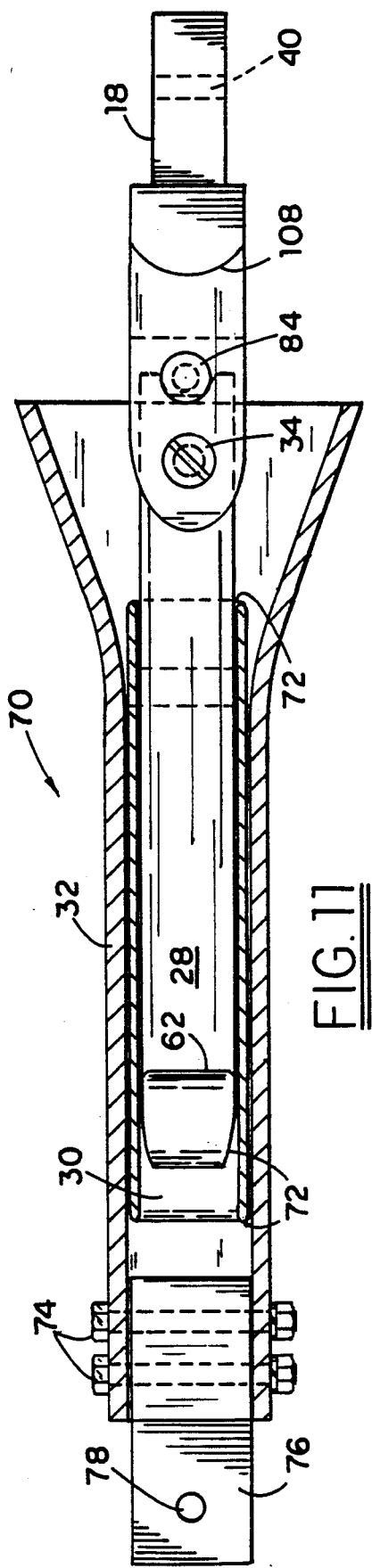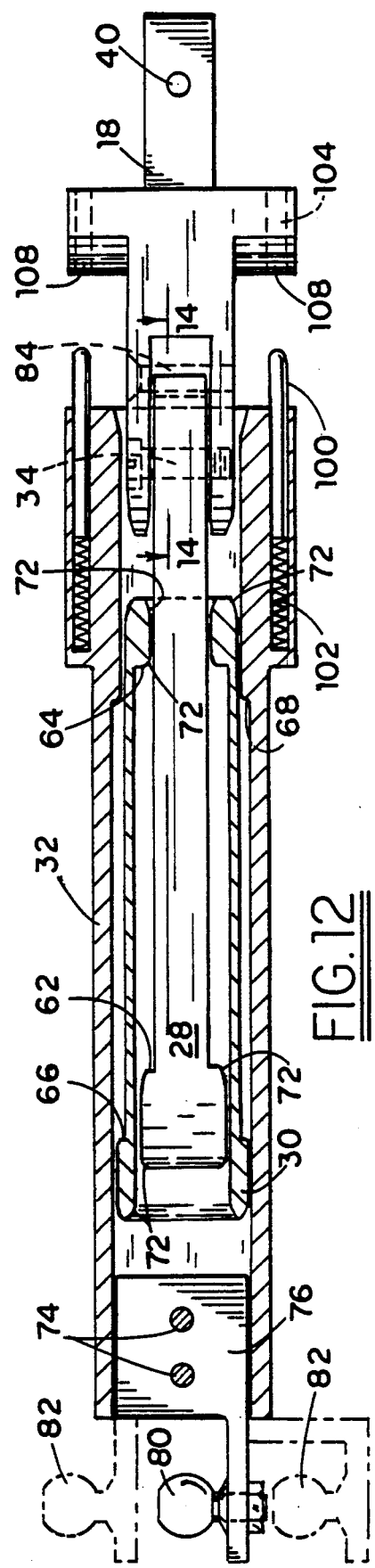

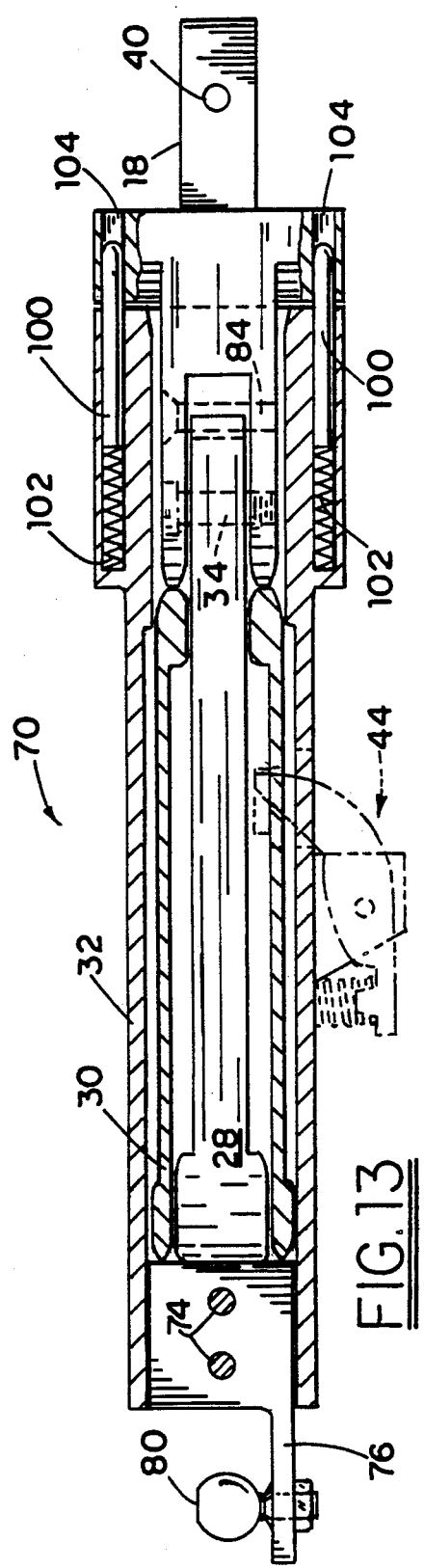
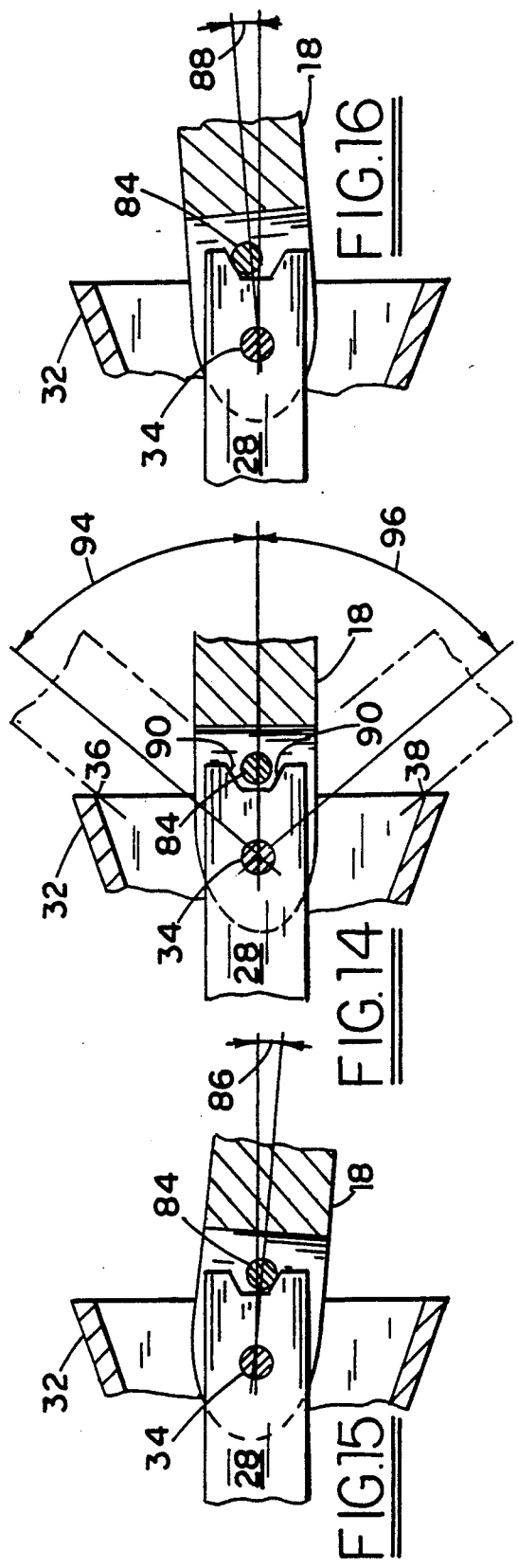

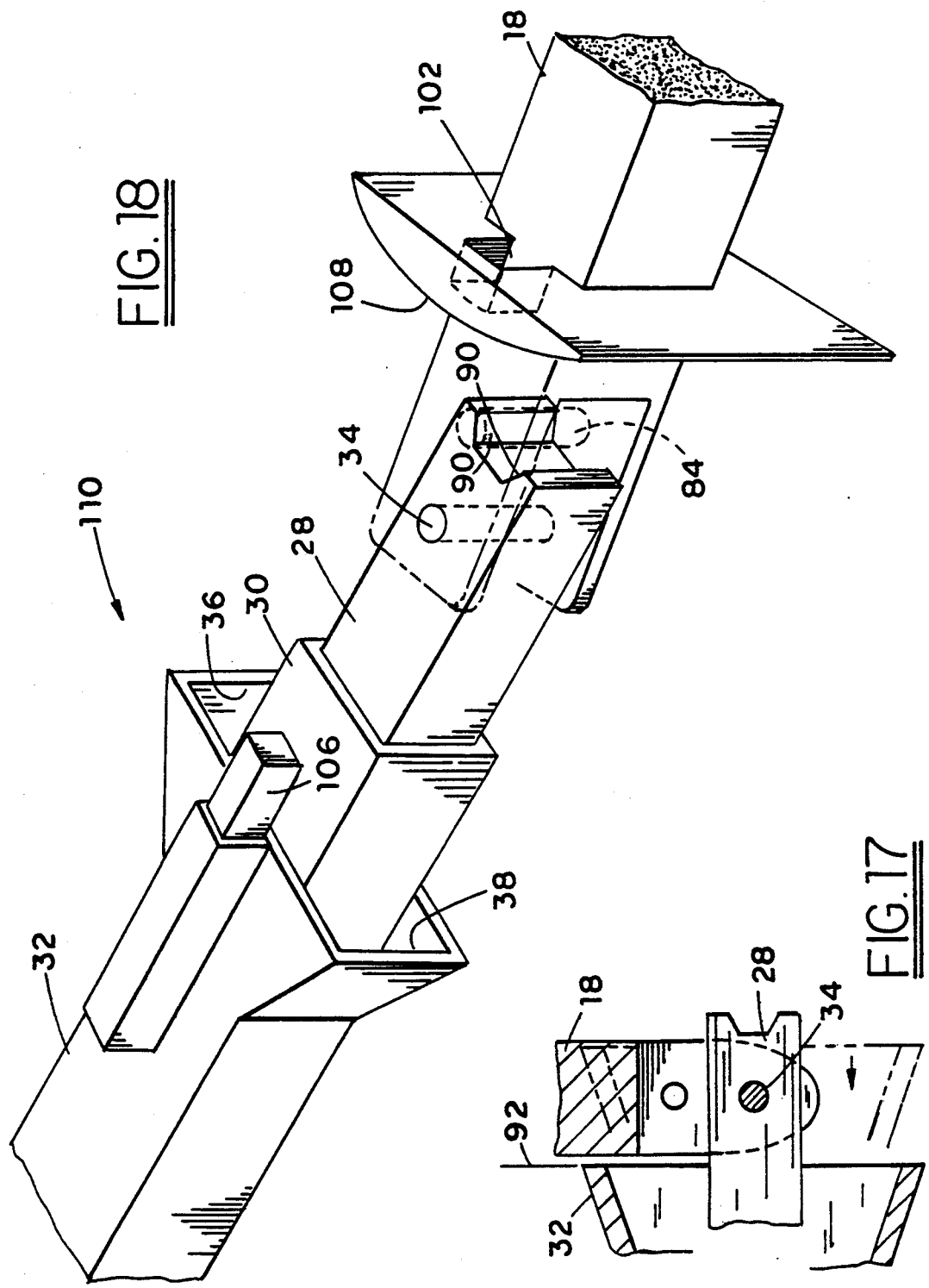

AUTOMATIC SELF-ALIGNING TRAILER HITCH

FIELD OF THE INVENTION

A trailer hitch which automatically couples a trailer to its towing vehicle.

BACKGROUND OF THE INVENTION

Automatic trailer hitches are known to those skilled in the art. Thus, U.S. Pat. Nos. 4,606,549 and 4,560,184 of Williams disclose an automatic trailer hitch assembly having a metal formed housing with a forward ledge portion and a ball socket at its towing end. However, the hitch assembly of Williams requires that the vehicle to be towed and the towing vehicle be precisely positioned close together.

U.S. Pat. No. 4,666,177 of Vinchattle discloses a hitch designed for coupling to a drawbar on a draft vehicle that includes a guide means for guiding the trailer tongue into automatic locking position with a spring loaded hitch pin. However the assembly of Vinchattle, like the assembly of Williams, requires that the draft vehicle and the towing vehicle be precisely positioned closely together before they can be hitched.

U.S. Pat. No. 4,799,711 of Moore discloses a tow bar comprised of telescoping sections which are locked in position by a plurality of locking pins. The tow bar of Moore will tow a maximum load of 650 pounds at a speed not to exceed 25 miles per hour; the locking pins must be inserted manually into it; and it is not self-aligning.

It is an object of this invention to provide a hitch assembly which which may be used to tow loads in excess of 5,000 pounds at normal highway speeds.

It is yet another object of this invention to provide a hitch assembly which, because it allows for compensation of longitudinal, lateral, and angular misalignments of the trailer and towing means during hitching operations, does not require that the trailer and the towing means be precisely and closely moved near each other prior to hitching.

It is yet another object of this invention to provide a hitch which can be readily attached to a trailer and a towing means without a substantial amount of work, strength, or expertise.

It is yet another object of this invention to provide a hitch assembly which, once it has been attached to the trailer and the towing means, will automatically lock into that position which will insure maximum strength and stability once the towing means is backed towards the trailer and the hitch is contracted into its locking position.

SUMMARY OF THE INVENTION

In accordance with this invention, there is provided an automatic trailer hitch assembly for use with a towing vehicle and a towed vehicle. This hitch assembly is comprised of: first attachment means for attaching one end of the assembly to the towing vehicle; second attachment means for attaching the other end of the assembly to the vehicle to be towed, telescoping means for longitudinally extending and contracting the hitch assembly to a predetermined maximum length and a predetermined minimum length, respectively; stop means for preventing the disengagement of said telescoping means once the hitch has reached said maximum length; and first locking means for automatically locking said telescoping means into place once the hitch has reached said minimum length.

DESCRIPTION OF THE DRAWING

The present invention will be more fully understood by reference to the following detailed description thereof, when read in conjunction with the attached drawings, wherein like reference numbers refer to like elements, and wherein:

FIG. 11 is a top view of another preferred embodient of the invention.

FIG. 12 is a side view of the embodiment of FIG. 11.

FIG. 13 is another side view of the embodiment of FIG. 11, showing it with locking pins engaged.

FIG. 14 is a partial top view of a swing angle retardant mechanism, taken along line 14—14 on FIG. 12.

FIGS. 15 and 16 are each a partial top view of the mechanism of FIG. 14, showing the swing angle retardant mechanism at an extreme of travel.

FIG. 17 is a partial top view, similar to FIG. 14, showing a full 90 degree swing angle.

FIG. 18 is a perspective view of yet another preferred embodiment of the invention.

DESCRIPTION OF THE PREFERRED EMBODIMENTS

The advantages of the hitch of this invention are schematically illustrated in FIGS. 1 through 6.

Figure 1:
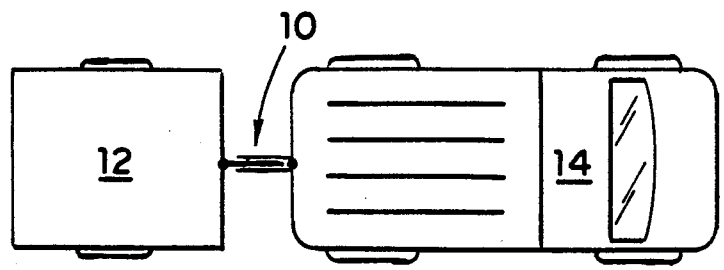
FIGS. 1, 2, 3, and 4 illustrate the capabilites of the hitch of this invention. These figures are top views of a trailer and pickup truck which are hitchably connected to each other at various distances from and in different positions vis-a-vis each other.

Referring to FIG. 1, hitch 10 is used to connect a trailer 12 to a pickup truck 14. Although a pickup truck is illustrated in the drawings, it will be appreciated by those skilled in the art that other means for towing a trailer may be used with the hitch 10 of this invention. Thus, the towing means 14 may be any type of motor vehicle such as, e.g., an automobile, a truck, a bus, and the like.

The towing means 14 usually comprises some apparatus for attaching the towing means to a hitch. Thus, as is well known tot those skilled in the art, such attachment means include, e.g., standard square sockets designed for class 2 and class 3 hitches, standard ball mounts for use on trailers, and the like. Thus, e.g., said means may include the conventional trailer ball coupler described in U.S. Pat. No. 4,560,184 of Williams, the disclosure of which is hereby incorporated by reference into this specification. Alternatively, or additionally, such attachment means may be contained on one or both of the ends of applicant's hitch. Applicant's hitch is comprised of means for attaching it to both a draft vehicle and a towing vehicle. Said hitch preferably comprises both a first attachment means for attaching one end of the hitch to a towing vehicle, and a second attachment means for attaching the other end of the hitch to the vehicle to be towed. It will be apparent that both the towed vehicle and the vehicle to be towed also must comprise means enabling them to be attached to applicant's hitch. Any of the conecting means known to those skilled in the art, such as, e.g., said ball socket and/or square socket, may be used on one or both ends of said hitch and/or one one or both of the towed vbehicle and the towing vehicle.

In FIG. 1, trailer 12 and means for towing the trailer 14 are shown in their normal hitched position; in this position, the hitch of this invention has its maximum strength and stability; it is contracted to the maximum extent possible, and it is locked into a substantially 90 degree angle with respect to the towing vehicle.

Figure 2:
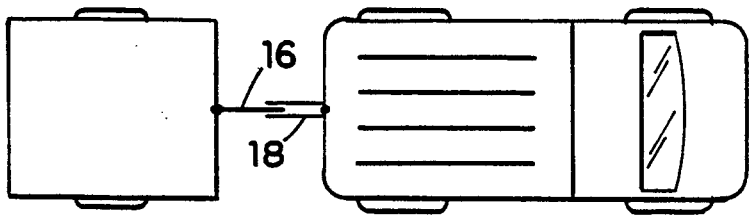

FIG. 2, by comparison, shows these two vehicles further apart due to the telescoping capability of the hitch of this invention obtainable with trailer member 16 inside towing member 18.

Figure 3:
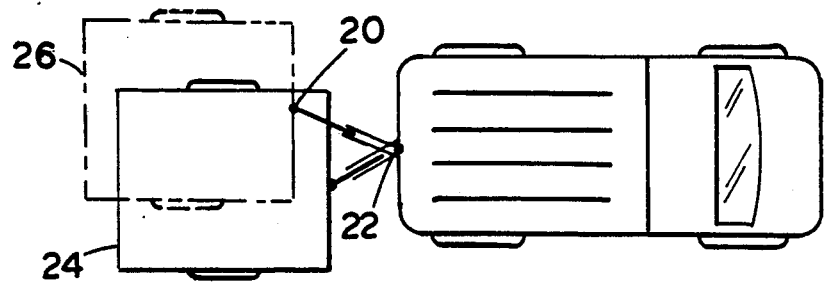

Referring to FIG. 3, it will be seen that, with the hitch of this invention, trailer 12 may be laterally displaced from towing means 14; see the depiction of the trailer in solid lines 24. In one preferred embodiment, this lateral displacement is allowed by pivotal joints 20 and 22 on trailer 12 and towing means 14, respectively.

Referring again to FIG. 3, it will also been seen that the hitch of this invention allows trailer 12 to be both laterally and longitudinally displaced from towing member 14.

Figure 4:
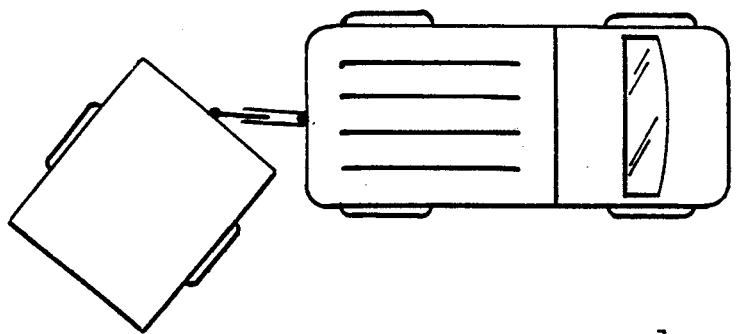

FIG. 4 shows how the hitch of this invention allows trailer 12 to be angularly displaced from towing means 14.

Even when the hitch of this invention connects trailer 12 with towing means 14 so that the trailer and towing means are laterally and/or angularly displaced, the hitch is provided with means for automatically correcting such displacement(s). By backing the towing means 14 towards the trailer, the telescoping portions of the hitch (not shown) contract the length of the hitch until, when the hitch reaches a certain specified minimum length, it is locked into place. Similarly, when the position of the towing means is shifted with regard to that of the trailer, alignment means (not shown) lock the hitch into place when the hitch and the trailer are in a substantially 90 degree relationship with each other.

Although FIGS. 1 through 4 show trailer 12 in several different positions with respect to towing means 14, it is apparent that many other positions (not shown) may be obtained between these two vehicles due to the combination of the telescoping and pivoting features described. Furthermore, while the vehicles are shown hitched in FIGS. 1 through 4, it will be evident to those skilled in the art that they may be unhitched in similar positions relative to each other.

Figures 5, 6:
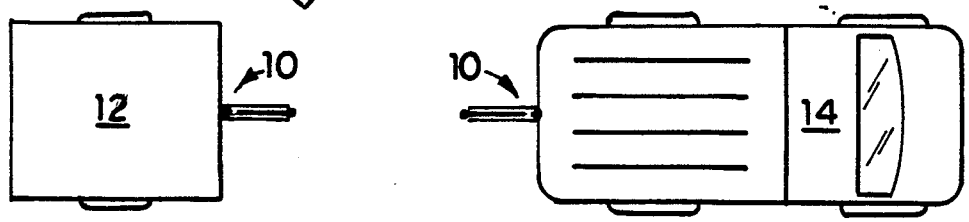
FIG. 5 is a top view of a trailer with one embodiment of the hitch of this invention connected to it.
FIG. 6 is a top view of a pickup truck with one embodiment of the hitch of this invention connected to it.

Hitch 10 may be attached to either of vehicles 12 or 14 when the vehicles are unhitched. FIG. 5 shows the hitch 10 attached only to trailer 12. FIG. 6 shows the hitch 10 attached only to the towing means 14. Either end of hitch 10 may be connected to either trailer trailer 12 or towing means 14.

In one embodiment, not shown, the trailer 12 is equipped with means for attaching the trailer to one end of the hitch. Thus, referring to FIGS. 7, 8, 9, and 10, towing member 18 is connected by means of pin 34 to the outermost telescoping member 32 of the hitch. In the preferred embodiment illustrated in these Figures, member 18 is permanently attached to the trailer.

Figure 7:
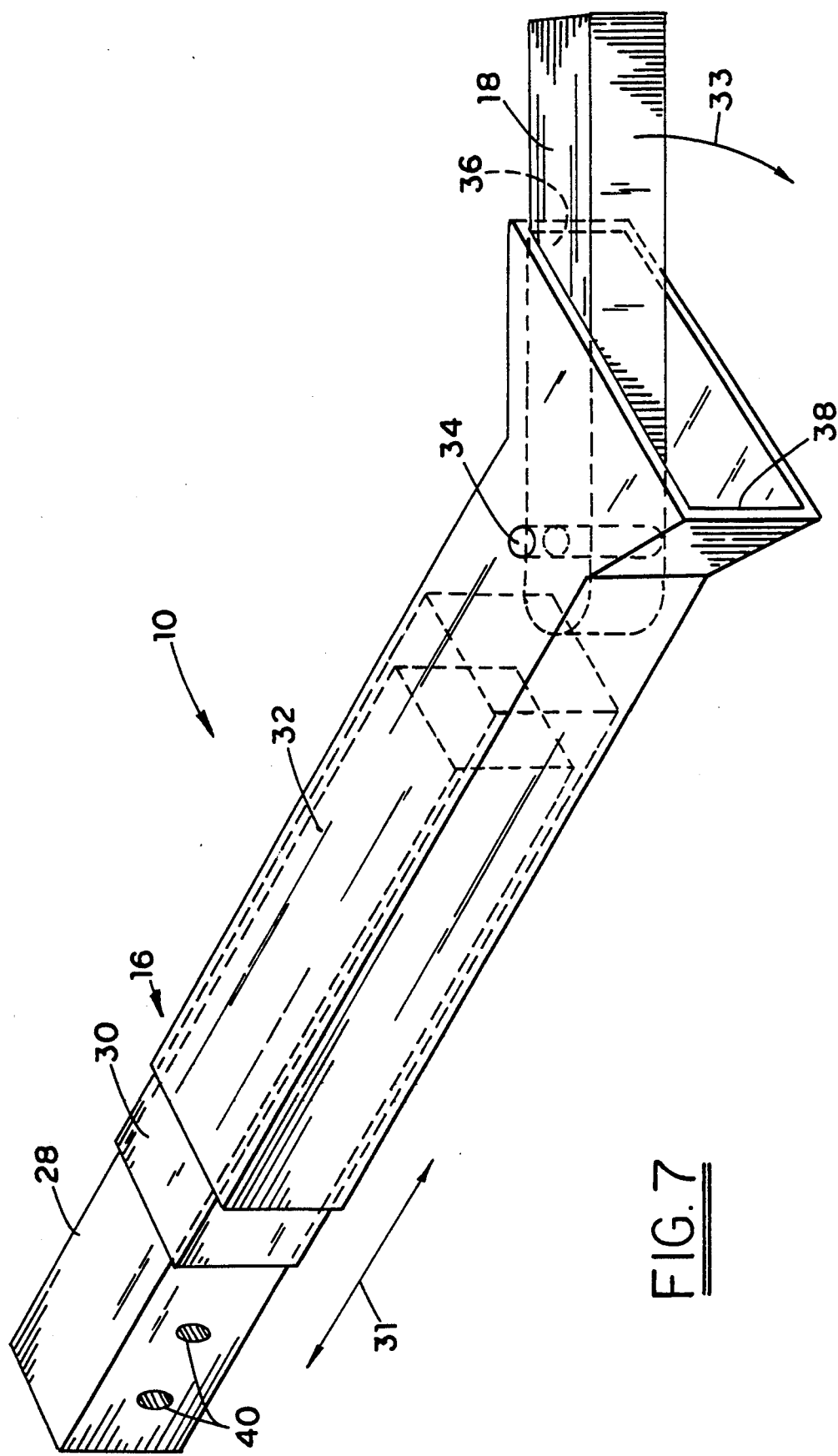
FIG. 7 is a perspective view of one preferred embodiment of the hitch of this invention.

In another embodiment, illustrated in FIG. 7, holes 40 in the distal end of the hitch may be used to attach such distal end to the towing means 14. One such means of attachment is illustrated in FIG. 7, wherein the holes through the distal telescoping member extend through the narrowest of such members (extension bar 28). Another such means of attachment is illustrated in FIG. 12, in which the ball mount means of attachment are secured in the inner surfaces of the widest of such members (extension bar 32). In another embodiment, not shown, the ball mount is secured to the outer surfaces of the widest of such members.

FIG. 7 illustrates one of the preferred embodiments of this invention and illustrates its ability both to change its length and accomplish angular movement.

In the embodiment shown in FIG. 7, changes in length (illustrated by arrow 31) of hitch 10 are accomplished with telescoping means for longitudinally extending and contracting the hitch assembly to a predetermined maximimum length and a predetermined minimum length, respectively. In the preferred embodiment of FIG. 7, these telescoping means comprise inner slidable member 28, intermediate slidable member 30, and outer slidable member 32. These members collectively provide a means for extending and contracting the length of hitch 10. In this embodiment, slidable members 28, 30, and 32 are rectangular tubular members which are slidably journaled within each other, thus allowing changes in length to their telescoping nature. It will be apparent to those skilled in the art that other slidable members 28, 30, and 32 may be used. Thus, by way of illustration, one may use square tubular members, triangular tubular members, circular tubular members, octagonal tubular members, and the like. In one embodiment, member 28 and/or member 30 and/or member 32 has a different cross-sectional shape than the other member(s).

Although three slidable members, 28, 30, and 32, are shown in FIG. 7, it will be apparent to those skilled in the art that more or fewer of such members may be used. It is preferred that hitch 10 comprise at least two of such telescoping members. In one embodiment, hitch 10 comprises from about 2 to about 4 of such members.

In the embodiment illustrated in FIG. 7, each of members 28, 30, and 32 are substantially concentric but have different inner and outer dimensions; member 28 is smaller than member 30 which, in turn, is smaller than member 32. Member 32 at its proximal end is provided with a means for limiting the motion of towing member 18.

Outer slidable member 32 is pivotally attached to towing member 18 by pivot pin 34. As will be apparent to those skilled in the art, other means of pivotally attaching slidable member 32 to towing member 18 may be used. Thus, for example, one may use a nut and bolt, a threaded fastener, and the like.

The angular displacement between towing member 18 and outer slidable member 32 is limited by stops 36 and 38, which limits the angular travel 33 of towing member 18. Other means of limiting the angular travel of towing member 18 may be used. Thus, for example, one may limit the travel of member 18 by pins or bolts, a plate, and the like.

The angular displacement of the other end of hitch 10 may be accomplished by means of a common trailer ball coupler (not shown), or ball (not shown), etc., which may be attached to inner slidable member 28 by means of fastener holes 40, by welding, by other conventional coupling means, and the like.

Figure 8:
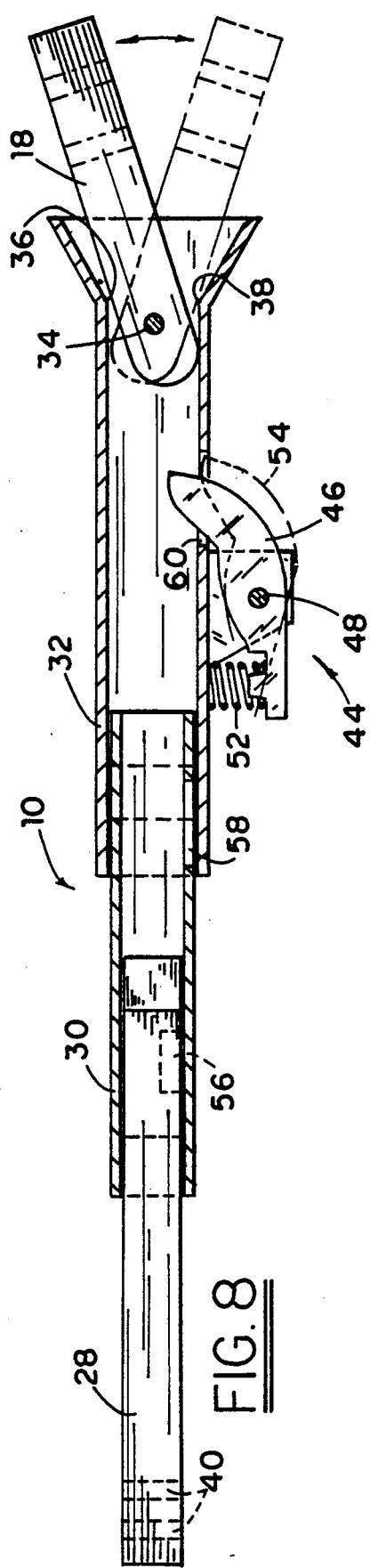
FIG. 8 is a top view of the embodiment of FIG. 7, showing it in an extended, unlatched position.
Figure 9:
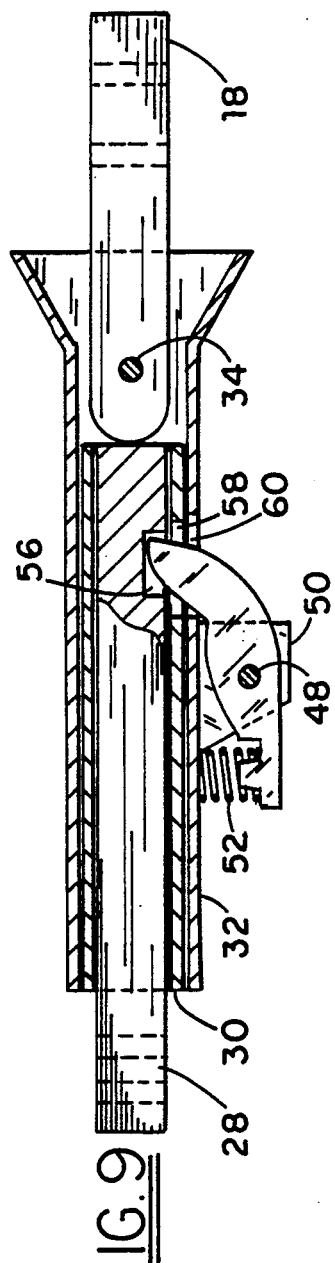
FIG. 9 is a top view of the embodiment of FIG. 7, showing it in a retracted, latched position.
Figure 10:
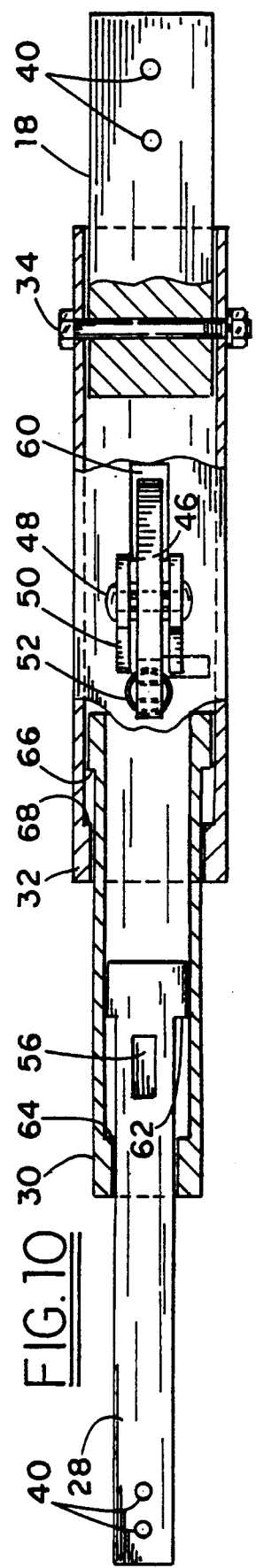
FIG. 10 is a side view of the embodiment of FIG. 8.

FIGS. 8, 9, and 10 illustrate another preferred embodiment of applicant's invention. The embodiment of these Figures is similar to the embodiment of FIG. 7. Thus, in this embodiment, slidable members 28, 30, and 32 telescope to change the length of hitch 10, and member 18 is pivotally attached to member 32 by means of pivot pin 34 to allow angular travel 33 between stops 36 and 38.

The embodiment of FIGS. 8, 9, and 10 is comprised of means for limiting the extent to which hitch 10 may be extended. The presence these means provides a predetermined maximum length to which the hitch may be extended. Thus, latch 10 is provided with means for limiting the extent to which inner slidable member 28 may be extended from intermediate slidable member 30. In the embodiment illustrated in FIG. 10, inner slidable member 28 is provided with stop surfaces 62, and intermediate slidable member 30 is provided with stop surfaces 64. When members 28 and 30 are extended to the maximum extent possible, stop surfaces 62 and 64 contact each other and prevent member 28 from being removed from member 30.

Means are also provided for limiting the extent to which intermediate slidable member 30 may be extended from outer slidable member 32. In the embodiment illustrated in FIG. 10, these means comprise stop surfaces 66 on intermediate member 30 which, when members 30 and 32 are extended to their maximum length, abut stop surfaces 68 of member 32.

Hitch 10 is provided with means for attaching each of its ends to towing means 14 and trailer 12, respectively. Once the hitch has been so attached, the towing means may be backed towards the trailer, thus causing the slidably journaled telescoping members 28, 30, and 32 to move in a manner that effectively shortens hitch 10 until a fully retracted length as shown in FIG. 9 is obtained. This fully retracted length is the "predetermined minimum length" described above; it occurs when the latching mechanism of the device is activated. When the hitch reaches its predetermined minimum length, a latching mechanism automatically locks the telescoping members into the retracted position.

Any means for retracting hitch 10 and automatically locking hitch 10 once it reaches its retracted position may be used. In the embodiment shown in FIGS. 8 through 10, the latching mechanism 44 is comprised of a latching pawl 46 which pivots about a pin 48 that is inserted in a latching pawl mount 50. Spring 52 biases the rotation of latching pawl 46 in a direction causing it to move through clearance hole 58 in outer member 32, clearance hole 60 in intermediate member 30, and into a latching pawl receiving slot 56 in inner member 28 when the hitch 10 is in the retracted position shown in FIG. 9. The mechanism 44 may be unlatched by applying pressure to the latching pawl in such a manner that pawl position 54, shown in phantom lines in FIG. 8, is attained. At that point the telescoping members may be pulled to any extended length desired from hitch 10.

As will be apparent to those skilled in the art, latching mechanism 44 will lock the hitch 10 into the retracted position only when orifices 56, 58, and 60 are aligned and thus allow the passage of pawl 46 through said orifices. Pressure from spring 52 always biases pawl 46 towards the locked position, and the curvature of the pawl allows the telescoping sections to compress the spring and push the pawl out of the way until the orifices are aligned.

Another preferred embodiment of the intention is illustrated in FIGS. 11 through 17. This embodiment differs from the prior embodiment in that the slidable members 28, 30, and 32 contain rounded ends 72 to prevent galling or scuffing of the members as they slide within each other; see, e.g., FIGS. 13 and 14. This embodiment also differs from the prior embodiment by the provision of locking pins 100 that are biased by springs 102 located in holes in outer member 32 (see FIG. 12).

The embodiment illustrated in FIG. 18 provides a means for aligning hitch 10 so that it will be substantially perpendicular to the vehicle to which it is attached. When the hitch has been fully retracted (and locked into the retracted position), the trailer and the towing means are moved until member 32 is aligned with member 18. When members 32 and 18 are aligned, locking pins 106 are free to enter slots 102, at which point the device is aligned and locked into position.

Referring to FIG. 12, member 18 is comprised of slots 104 which are adapted to receive locking pins 100. Pins 100 enter holes 104 when the hitch is fully retracted (see FIG. 13), thus forming a rigid, non-swivelling connection between members 32 and 18 once they are latched by latch mechanism 14. As will be apparent to those skilled in the art, spring-loaded pins 100 are usually fully extended. The fully extended pins may be compressed by cam surface 108 to less than full length; however, once they find slots 102, they extend to their full length and lock into place.

If, during the latching operation, the trailer 12 and the towing means 14 are not in alignment with each other, the locking pins 12 will be moved towards and compress springs 102 with the ends of the pins abutting runded surface 108 of member 18. Once the towing has begun, at some point the pins will align with holes 104, and they will then seat in holes 104 due to the pressure of springs 102.

Referring again to the preferred embodiment shown in FIG. 12, it will be seen that the location of hitch ball 80 may be varied. The ball 80 is affixed to the ball mount 76 which, in turn, is affixed to outer member 32 by fasteners 74. By varying the shape of ball mount 76, the ball position can be changed to other locations, as shown in phantom lines 82.

Another means of limiting angular travel between members 28 and 18 is shown in FIG. 14. Referring to FIG. 14, which is taken along line 14—14 of FIG. 12, members 28 and 18 are pivotally attached to each other by pivot pin 34. A removable angle limiting stop pin 84 is mounted in member 18; see FIGS. 13, 14, 15, and 16. When stop pin 84 is in place, it abuts surface 90 when member 18 is moved to its extreme left or its extreme right position; as is shown in FIG. 14, surface 90 is located on the proximal end of member 28. The limiting of angular travel to the right is shown in FIG. 14, and the limiting of angular travel to the left is shown in FIG. 16.

If angle stop pin 84 is removed from hitch 10, the angular movement between members 18 and 28 may be increased to angles 94 and 96, to the left and right, respectively; see, e.g., the positions of members 18 and 32 in FIG. 17. In one embodiment, not shown, when outer member 32 is at a right angle to member 18, it is locked into such position with conventional locking means such as, e.g., a clip or a latch.

In one embodiment of the invention, outer member 32 may be moved so that it is at a right angle to member 18. Thus, referring to FIG. 17, outer member 32 may be moved to line 92 to allow the angle betwen members 18 and 28 to become substantially 90 degrees. To accomplish this, the latching mechanism 44 shown in phantom on FIG. 13 must be unlatched. At this point the hitch assembly 70 may be swung to the side about 90 degrees (as shown in FIG. 17) for storage flat against the towing means bumper or the like.

Yet another preferred embodiment of the invention is illustrated in FIG. 18. This embodiment is similar to the embodiment of FIGS. 11–17. In this embodiment, the pins 106 ride against surface cam 108 when the towing means 14 is backed up to retract the hitch 110 to its shortened length. By adjusting the movement of the towing vehicle, pins 106 can be aligned with holes 102 in member 18, thus giving a rigid, non-swivelling jint between members 18 and 32 when held in place by a suitable latching mechanism (such as that shown as 44 in FIG. 13).

The advantages of the hitch assembly of this invention will be apparent to those skilled in the art. Thus, referring again to FIG. 1, in the assembly's normal hitched position it is strong and durable enough to carry relatively heavy loads at high speeds. Referring to FIG. 2, the hitch may readily be attached to a pickup truck and a trailer without the need to move them close together; the telescoping sections of the hitch allow it to be extended from one vehicle to the other; and, once the two ends of the hitch are connected, the pickup truck may be backed towards to trailer, causing the hitch to automatically align and lock. Referring to FIGS. 3 and 4, in addition to allowing attachment to a trailer which is longitudinally misaligned with the pickup truck, the hitch also allows attachment to a trailer which is angularly misaligned with the pickup truck; once the ends of the hitch have been connected to the trailer and the pickup truck, moving the pickup truck and/or backing it towards the trailer will cause the hitch to automatically contract and/or align and lock into position.

As those skilled in the art will be aware, various changes can be made in the hitch of this invention without departing from the scope of the invention. It thus is intended that all of the matter contained in the above description, or shown in the accompanying drawing, shall be interpreted as illustrative only and not limiting.

I claim:

1. An automatic, self-aligning trailer hitch assembly for use with a towing vehicle and towed vehicle comprised of:
  (a) a first attachment means for attaching a first end of said hitch assembly to said towing vehicle;
  (b) an integral second attachment means for pivotally attaching a second end of said hitch assembly to said towed vehicle;
  (c) telescoping means for longitudinally extending and contracting said hitch assembly to a predetermined maximum length and a predetermined minimum length, respectively, said telescoping means is comprised of at least a first tubular integral telescoping member and a second tubular integral telescoping member said first telescoping member is pivotally attached to said second attachment means, said second telescoping member is removably attached to said first attachment means, and:
    1. said first attachment means is comprised of a first attachment member and a second attachment member, said first attachment member has a first end with a cross-sectional shape which is substantially congruent with the cross-sectional shape of said second telescoping member and said second attachment member is removably connected to said first attachment member;
    2. at least one of said integral first and second telescoping means is comprised of at least one projection disposed within and integrally connected to the inner surface of said telescoping member;
  (d) means for allowing said first telescoping member to pivot in a horizontal axis;
  (e) means for limiting the extent to which said first telescoping member may pivot in said horizontal axis;
  (f) means for preventing said first telescoping member from pivoting in a vertical axis; and
  (g) stop means for preventing the extension of said telescoping members beyond a first specified point.

2. The hitch assembly as recited in claim 1, wherein said hitch assembly is comprised of at least two spring-loaded locking pins which are attached to opposing, exterior surfaces of said hitch assembly.

3. The hitch assembly as recited in claim 2, wherein said hitch assembly is pivotally attached to a solid towing member.

4. The hitch assembly as recited in claim 3, wherein said solid towing member is attached to a vehicle selected from the group consisting of said towing vehicle and said towed vehicle.

5. The hitch assembly as recited in claim 4, wherein said solid towing member is comprised of at least two slots adapted to receive said spring-loaded locking pins.

6. The hitch assembly as recited in claim 1, wherein said telescoping means comprise from about 2 to about 4 telescoping members.

7. The hitch assembly as recited in claim 6, wherein said telescoping members are disposed with respect to each other so that they are concentric.

8. The hitch assembly as recited in claim 7, wherein each of said telescoping members has a substantially square cross-section.

9. The hitch assembly as recited in claim 7, wherein each of said telescoping members has a substantially circular cross-section.

10. The hitch assembly as recited in claim 7, wherein each of said telescoping members has a substantially rectangular cross-section.

11. The hitch assembly as recited in claim 10, wherein said hitch is comprised of three of said substantially rectangular telescoping members.

* * * * *